Jan. 13, 1953  C. L. CARELOCK  2,625,122
PLANT SETTING MACHINE
Filed Jan. 10, 1947  6 Sheets-Sheet 1
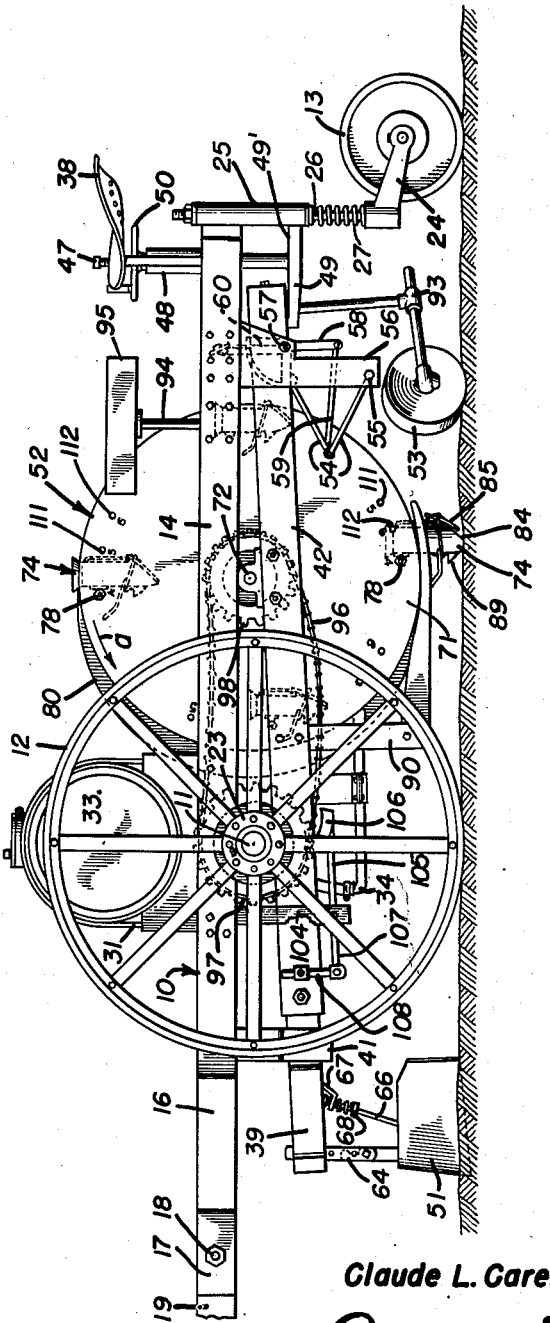
Fig. I.
Inventor
Claude L. Carelock
By Clarence A. O'Brien
and Harvey B. Jacobson
Attorneys

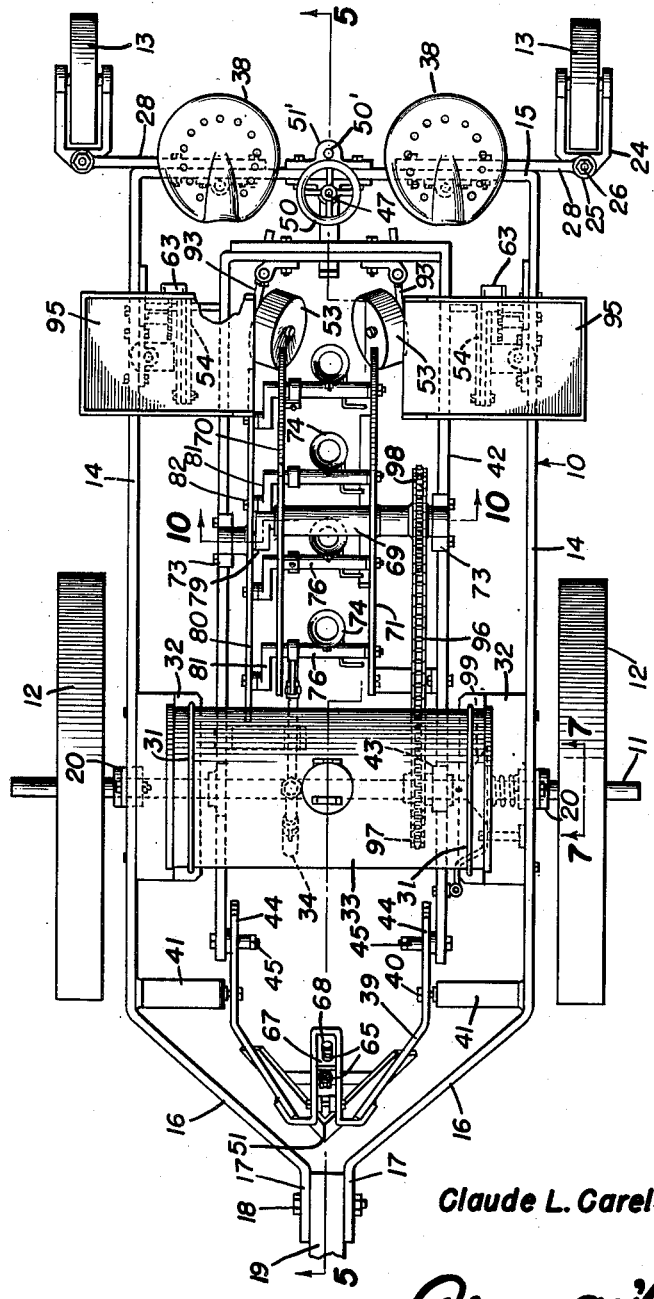

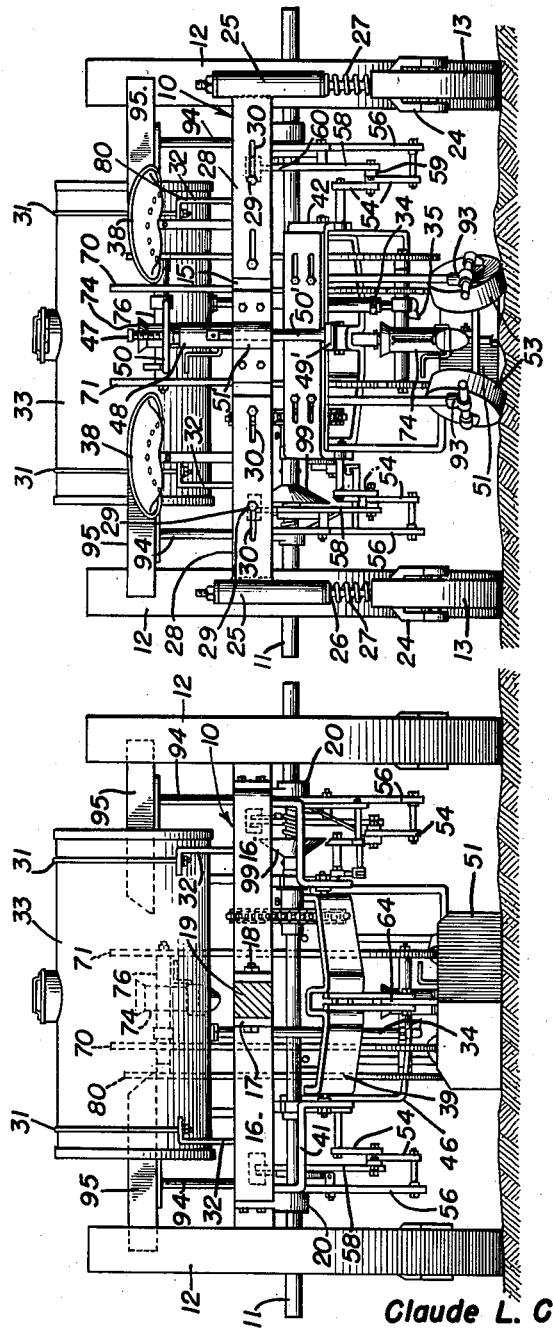

Jan. 13, 1953

C. L. CARELOCK 2,625,122

PLANT SETTING MACHINE

Filed Jan. 10, 1947

Inventor

Claude L. Carelock

By *Clarence A. O'Brien
and Harvey B. Jacobson*
Attorneys

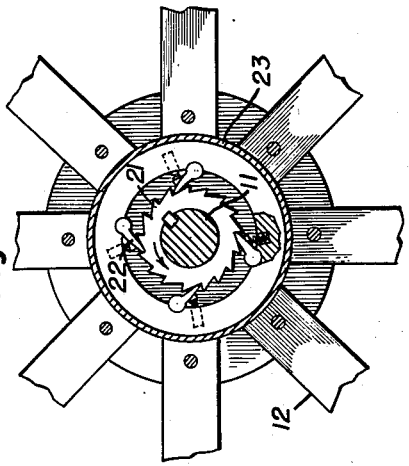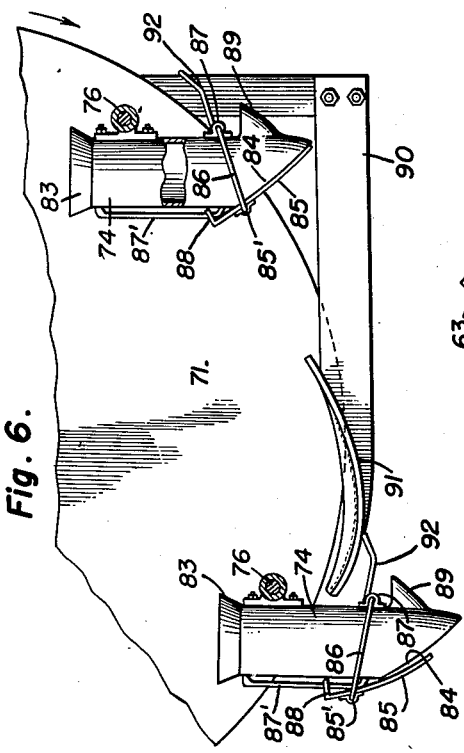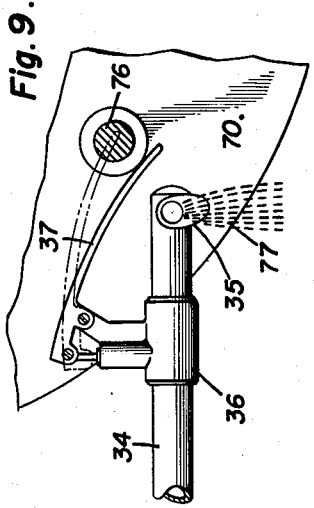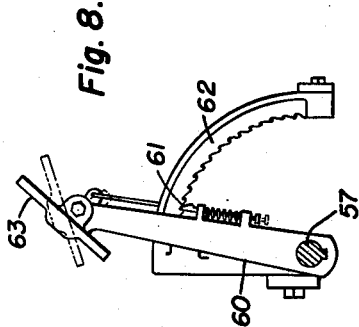

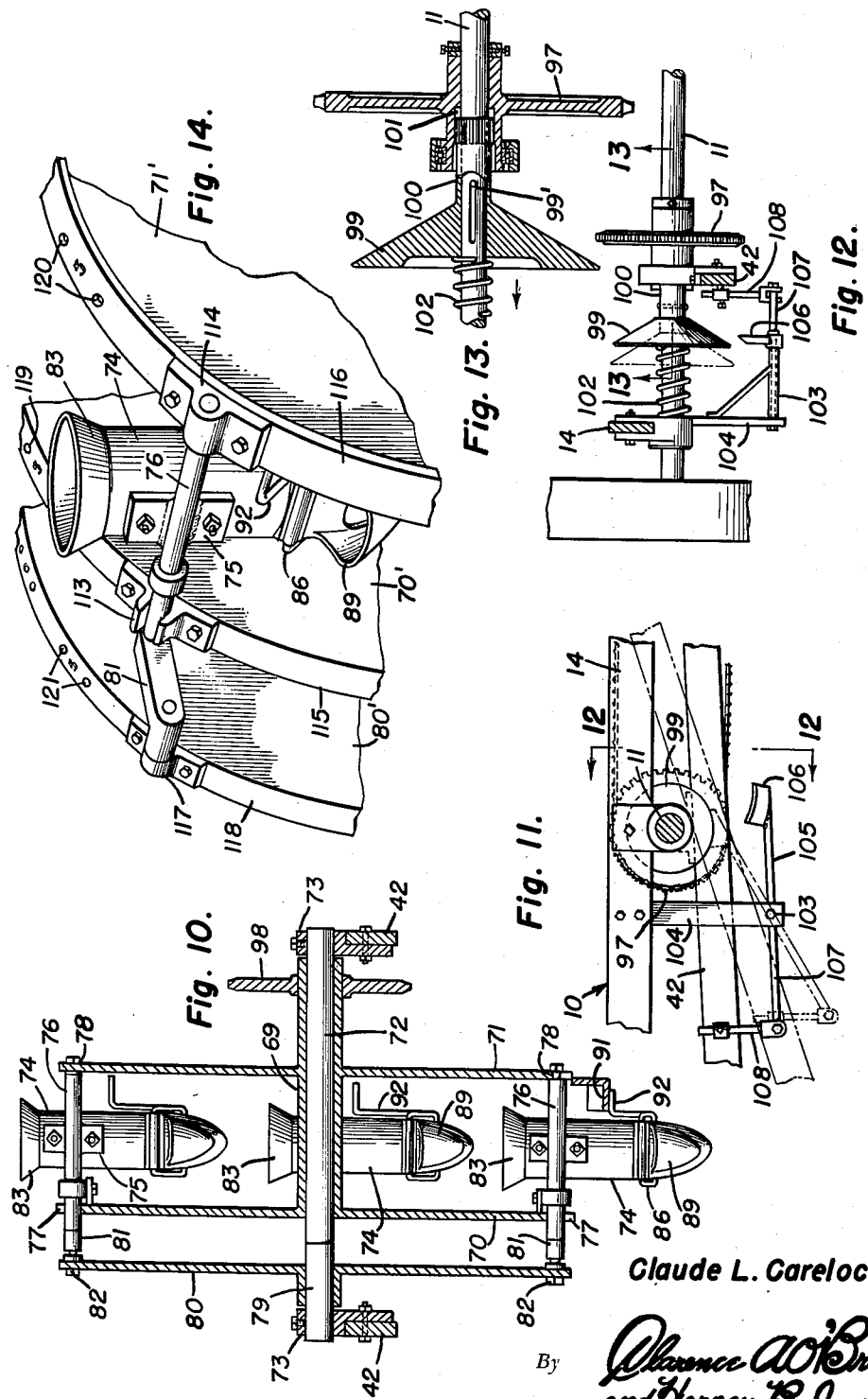

Patented Jan. 13, 1953

2,625,122

UNITED STATES PATENT OFFICE 2,625,122

PLANT SETTING MACHINE

Claude L. Carelock, Douglas, Ga.

Application January 10, 1947, Serial No. 721,244

2 Claims. (Cl. 111—3)

The present invention relates to a novel machine for setting plants in the earth in uniformly spaced relation.

An object of the invention is to provide a machine of the above kind embodying a novel plant setting wheel having pivoted plant-receiving buckets, and novel means to constantly maintain said buckets in upright position.

Another object is to provide plant-receiving buckets of novel form, and novel means for successively opening the buckets at the bottom of the plant setting wheel to deposit the plants in a furrow.

A still further object is to provide means to facilitate variation of the number of plant buckets carried by the plant setting wheel with the buckets uniformly spaced.

Further objects and features of the invention will appear from the following description when considered with the accompanying drawings, in which:

Figure 1 is a side elevation of one form of machine embodying the present invention.

Figure 2 is a top plan view thereof, partly broken away.

Figure 3 is a front elevation thereof.

Figure 4 is a rear elevation of the same.

Figure 6 is an enlarged detail view, partly in side elevation and partly in section, of a portion of the plant setting wheel.

Figure 7 is an enlarged detail view, partly in side elevation and partly in section, showing a portion of one of the front supporting wheels and the ratchet driving connection between the hub of said wheel and its axle.

Figure 8 is an enlarged detail view, partly in side elevation and partly in section, showing one of the foot levers and its associated rack segment which form part of means to quickly raise and lower the rear end of the rear section of the subframe to respectively render the furrow-opening, plant setting and furrow-closing means inoperative and operative with relation to the earth.

Figure 9 is an enlarged detail view, partly in side elevation and partly in section, showing a portion of the plant setting wheel, the water control valve, and the actuating means for said valve.

Figure 10 is an enlarged vertical transverse section taken through the plant setting wheel on line 10—10 of Figure 2.

Figure 11 is an enlarged detail view, partly in side elevation and partly in section, showing details of the clutch means for disconnecting the driving connection between the front axle and the plant setting wheel when the latter is raised to an inoperative position relative to the earth.

Figure 12 is a transverse section taken on line 12—12 of Figure 11.

Figure 13 is a section taken on line 13—13 of Figure 12.

Figure 14 is an enlarged fragmentary perspective view, showing a modification of the plant setting wheel.

Figure 5:
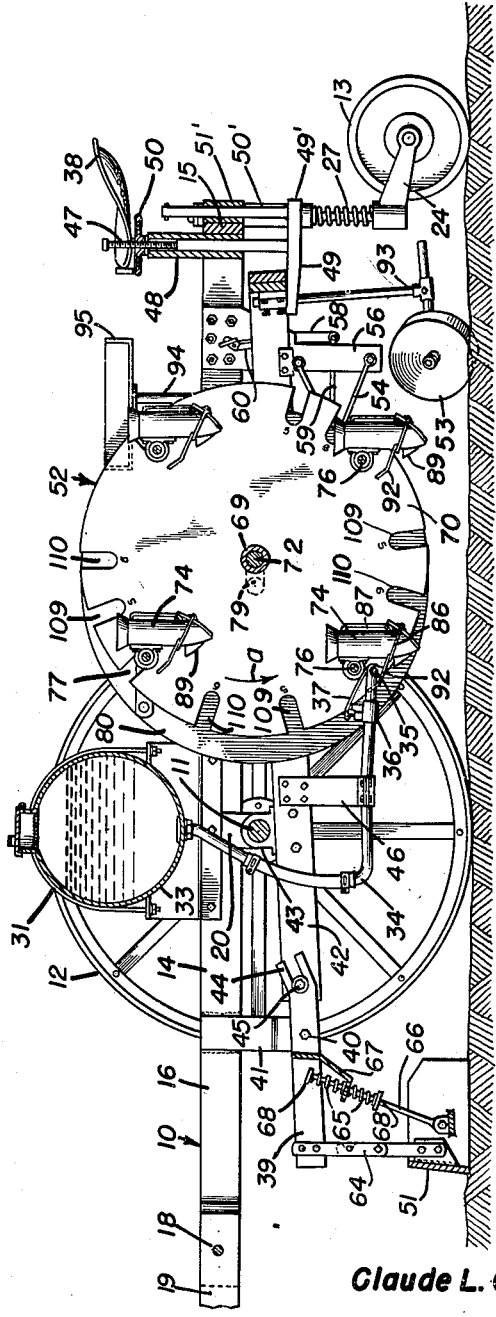
Figure 5 is a vertical longitudinal section taken on line 5—5 of Figure 2.

Referring in detail to the drawings, the illustrated form of the invention includes an open elongated main frame 10 mounted near its front end upon a rotatable transverse axle 11 provided on its end portions with supporting wheels 12, and at its rear end upon caster wheels 13. The wheels 12 are slidably mounted on the axle 11, and the mounts of the caster wheels 13 are adjustable toward or away from each other transversely of the frame 10 to vary the width of the wheel tracks in accordance with the spacing of the rows of plants, so that the wheels will run between the row being planted and the rows at opposite sides thereof. The frame 10 is composed of spaced side rails 14 connected by a transverse rear rail 15 and having forwardly converging front end portions 16 provided with spaced parallel front terminals 17 between which is secured at 18 the rear end of a draft bar or tongue 19. The side rails 14 carry bearings 20 in which the axle 11 is journalled, and a ratchet driving connection is provided between each wheel 12 and the axle 11 as shown in Figure 7, so that said wheels 12 will only drive said axle 11 upon forward travel of the machine. Each ratchet driving connection includes a ratchet wheel 21 keyed on the axle 11, and pivoted pawls 22 engaging said ratchet wheel and mounted in the hub 23 of the associated wheel 12. The mount of each caster wheel 13 comprises a fork 24 in which the wheel is journalled, a vertical post 25, a shaft 26 fixed at its lower end to fork 24 and rotatably and slidably fitted in the post 25, a spring 27 on the shaft 26 between the lower end of post 25 and the fork 24 to cushion shocks incident to passage of the wheel over obstructions or inequalities in the ground surface, and a bracket plate 28 fixed to the post 25 and bolted at 29 to the rear rail 15, the plate 28 having horizontal elongated slots 30 to receive the bolts at 29 and provide for the lateral adjustment of the caster wheels.

Clamped at 31 in cradles 32 secured on the side rails 14 is a transversely disposed water tank 33 provided with a downwardly and rearwardly extending pipe line 34 having a laterally extending discharge spout 35 at its lower end located to one side of the lower path of plant buckets hereinafter described and adapted to deliver a supply of water to the plant in each bucket just before it is deposited in the furrow. The pipe line 34 is provided with a spring-closed valve 36 having an operating lever 37 adapted to be actuated for opening the valve by the rock shafts, on which the buckets are mounted, at the proper moments to momentarily deliver supplies of water to the buckets.

Two seats 38 are mounted on the rear rail 15 in side by side relation to accommodate operators whose duty is to insert a plant in each bucket as it moves upwardly and forwardly in front of said operators at the rear of the plant setting wheel.

Disposed below and within the area bounded by the main frame 10 is a sub-frame composed of a short forward section 39 pivoted between its ends at 40 to brackets 41 carried by the main frame for vertical swinging movement, and a long rear section 42 similarly pivoted near its forward end at 43 on the axle 11, the section 39 comprising spaced members having forked rear ends 44 in which are pivotally engaged lateral pins 45 carried by the forward ends of spaced side members of the section 42. Thus, by raising and lowering the rear end of section 42, the front end of section 39 will be correspondingly moved. A bracket 46 attached to section 42 supports the lower part of line 34 in proper position.

The rear end of section 42 is vertically adjusted by jack means including a jack screw 47 movable through a vertical cylinder 48 fixed to the rear rail 15, a foot member 49 fixed on the lower end of jack screw 47 and engaged beneath the rear member of section 42, and a nut member 50 resting on the upper end of cylinder 48 and having threaded engagement with jack screw 47. By turning nut member 50 in one direction the rear end of section 42 and the front end of section 39 will be raised, and by turning said nut member in the opposite direction, such ends of the sections will be allowed to lower by gravity, thereby vertically adjusting relative to the ground a furrow opening plow 51 carried by the front of section 39, and a plant setting wheel 52 and wheels 53, for packing earth in the furrow around each plant, carried by the section 42 rearwardly of its pivotal axis at 43. The foot member 49 has a rearward extension 49' provided with an upwardly extending guide rod 50' that slides through a tubular guide 51' fixed to the rear rail 15. This prevents turning of jack screw 47 and braces the foot member 49 against bending relative to the jack screw.

Means are also provided, one within convenient reach of each of the operators occupying the seats 38, for quickly raising the plow 51, wheel 52 and wheels 53 to inoperative positions above and clear of the ground, so that the machine may be readily transported when not in use. Each such means includes toggle links 54, one having its outer end pivoted at 55 to the lower end of a bracket 56 depending from a side rail 14 of the main frame 10, and the other having its outer end pivoted to the rear portion of sub-frame section 42. A rock shaft 57 journalled in bracket 56 has a depending crank arm 58 connected to the pivotal connection between the toggle links 54 by a link 59. Fixed on shaft 57 is the lower end of foot lever 60 having a pedal actuated latch bolt 61 coacting with a rack segment 62 to releasably secure the lever 60 in adjustably swung positions. By tilting the pedal 63 of lever 60, the bolt 61 may be released, thereby permitting the lever 60 to be pressed forwardly. This causes arm 58 to pull the link 59 rearwardly so as to straighten the toggle links 54. As the pivot 55 of the lower link 54 cannot lower, the upper link 54 raises the rear end of section 42 so as to elevate the elements 51, 52 and 53, as stated, the bolt 61 holding the lever 60 in its forwardly pressed position to keep said elements raised until such time as the bolt 61 is released.

The plow 51 is secured on the lower end of a jointed shank 64 which allows the plow to yield and ride over rocks or other obstructions without causing damage to the plow, forward and rearward yielding of the plow being yieldingly resisted by springs 65 placed on a rod 66 that is hinged to the plow and slides through a guide bracket 67 carried by sub-frame section 39. The springs 65 are arranged above and below the bracket 67 and between the latter and abutments 68 on the rod 66.

The invention provides a plant setting mechanism for carrying the plants to planting position, and means for packing earth in the furrow over the roots and around the lower part of each plant to hold the plants in proper upright planted position. The plant setting mechanism includes the plant setting wheel 52 which has a hub 69 that is provided with spaced parallel disks 70 and 71 of similar diameter and is journalled on a transverse axle 72 spanning the sub-frame section 42 and having its ends secured at 73 on the side members of each section. Mounted on and located between the disks 70 and 71 adjacent the peripheries of the latter are a plurality of equally spaced plant buckets 74, each attached at the front and near the top to a bracket 75 fixed to the intermediate portion of a transverse horizontal rock shaft 76 which is removably mounted at its ends on the disks 70 and 71. As shown in Figures 1, 5 and 10, one end of each rock shaft 76 is journalled in a peripheral radial notch or open slot 77 of disk 70, and the other end of such rock shaft is removably journalled at 78 in a hole of disk 71. The axle 72 has a forwardly offset end portion 79 on which is journalled a disk 80 disposed eccentrically of the plant setting wheel. Each rock shaft 76 has a crank 81 at one end whose crank pin is journalled at 82 on or in the disk 80 near the periphery of the latter. Thus, as the plant setting wheel is rotated, the plant buckets are always maintained by the cranks 81 and disk 80 in an upright position.

Each plant bucket is of the dibble type and comprises an elongated tube having a flared upper end 83 to facilitate insertion of a plant therein and having its lower end pointed by cutting it on a curve at an acute angle to the longitudinal axis of the tube as at 84. Thus, by adjusting the wheel 52 at the proper elevation, the lower end of each bucket may pierce the ground at the bottom of the furrow to insure firm setting of the plant in the ground when the earth is packed over the plant roots by the covering wheels 53 as the bucket moves rearwardly and upwardly from the set plant. At its lower end, each bucket has a pivoted swinging closure plate 85 movable in an arc concentric with the edge of the tube at 84 and normally closed by gravity to retain the plant in the bucket until the latter reaches the bottom of the wheel 52. The closure plate 85 is pivoted at 85' on a bail 86 embracing the bucket and hinged at 87 to the latter. A guide rod or bar 87' on the bucket slidably receives an eye 88 on the closure plate 85 to quickly swing the latter on the pivot 85' away from the lower end of the bucket as it is raised by swinging the bail 86 upwardly, and to limit downward movement of the closure plate to fully closed position. At the front side of its lower portion, each bucket has an inlet spout 89 into which the supply of water is delivered from the discharge spout 35 of the pipe line 34 as the bucket moves downwardly and rearwardly at the bottom of wheel 52. Supported by a bracket 90 attached to the sub-frame section 42 is a cam track 91 arranged in the path of a lever 92 fixed to the hinged end of the bail 86 of each bucket. The cam track 91 is located at the bottom of the wheel 52 so as to open the closure of each bucket as it reaches its lowermost position, thereby setting the plant in the furrow immediately after the supply of water is delivered to the bucket. The forward travel of the machine compensates for the rearward movement of the bucket, so that the latter leaves the set plant without disturbing its upright position. Immediately after the plant is set, the covering wheels 53 pack earth in the furrow over the roots of and around the lower part of the plant to hold it upright where it may effectively grow.

The soil packing or covering wheels 53 are set in forwardly diverging relation at opposite sides of the row and at an oblique angle to the latter. They are journalled on the lower ends of suitable mounts 93 fixed to the rear member of sub-frame section 42.

Supported by standards 94 fixed to and rising from the side rails 14 are trays 95 adapted to receive supplies of plants to be set. Each tray is arranged in front of a seat 38 and at the rear of wheel 52 within convenient reach of the operator occupying said seat. Thus, the operators may take turns in placing plants in the plant buckets as they move upwardly at the back of said wheel 52.

The lever 37 is arranged in the path of the rock shafts 76 to one side of the buckets 74, so as to open the valve 36 and permit a supply of water to be delivered into the spout 89 of each bucket as the latter approaches the bottom of wheel 52. As soon as the shaft 76 leaves the lever 37 the valve 36 closes to shut off the supply of water.

Wheel 52 is driven from axle 11 by a sprocket chain 96 passing around a sprocket wheel 97 journalled on axle 11 and a sprocket wheel 98 secured on the hub 69, means being provided to normally clutch the sprocket wheel 97 to axle 11 so that the wheel 52 will be driven when the machine is drawn ahead and the elements 51, 52 and 53 are lowered to operative position, and to unclutch the same therefrom when the sub-frame section 42 is tilted to raise the plow 51, wheel 52, and wheels 53 to inoperative position clear of the ground. The latter means may include a cone 99 slidably secured at 99' on the axle 11 and having a clutch element 100 slidable into and out of engagement with clutch teeth provided in the hub of sprocket wheel 97 at 101. A spring 102 engages the clutch element 100 with the teeth 101. Journalled at 103 on a pivot bolt carried by a bracket 104 attached to frame 10 is a lever having an arm 105 provided at its free end with a cam shoe 106 and an arm 107 whose outer end is pivoted to a rod 108 fixed to the sub-frame section 42 forwardly of axle 11. The arrangement is such that when the section 42 is tilted to elevate the elements 51, 52, and 53 clear of the ground, the shoe 106 will ride on the tapered face of cone 99 at a right angle to axle 11, thereby moving the cone 99 against the action of spring 102 in a direction to disengage clutch element 100 from clutch teeth 101 and freeing the wheel 97 from axle 11. Conversely, when the section 42 is swung to lower the elements 51, 52 and 53 to operative position, the shoe 106 is disengaged from cone 99 and spring 102 moves said cone so as to engage element 100 with teeth 101 and thereby clutch wheel 97 to axle 11.

Means is provided to facilitate variation of the number of plant buckets carried by the wheel 52 with the buckets uniformly spaced, so that spacing of the set plants may be varied according to the requirements of different kinds of plants. In the form of Figures 1 to 10, the disk 70 has additional slots 109 and 110 similar to slots 77, and the disk 71 has additional holes 111 and 112 similar to the holes at 78. The slots 77 and holes 78 are used when four buckets are employed, as shown. The slots 109 and holes 111 are properly labelled and are arranged to receive the rock shafts 76 when five buckets are employed, and the slots 110 and holes 112 are labelled and arranged to receive the rock shafts 76 when six buckets are employed. Corresponding additional holes are provided in the eccentric disk 80 to receive the crank pins of cranks 81 when five or six buckets are used. In the form of Figure 14, the same result is had by journalling the rock shafts 76 in bearings 113 and 114 bolted to peripheral flanges 115 and 116 of the disks 70' and 71' of the plant setting wheel and by journalling the crank pins of cranks 81 in bearings 117 bolted to the peripheral flange 118 of the eccentric disk 80', the flanges 115, 116 and 118 having additional holes 119, 120 and 121 to facilitate bolting of additional bearings 113, 114 and 117 respectively on the disks 70', 71' and 80' when five or six buckets are used.

In operation, the operators occupying the seats 38 are provided with supplies of plants which are placed on the trays 95. With the elements 51, 52 and 53 properly lowered and the sprocket wheel 97 clutched to axle 11, the machine is moved ahead so as to drive the wheel 52 in the direction of arrow $a$. The operators then take turns in placing plants in the buckets, one plant being placed in each bucket as it moves upwardly at the rear of the wheel 52. When each bucket approaches the ground at the bottom of wheel 52 the rock shaft 76 of the bucket depresses lever 37 and opens valve 36 to supply the roots of the plant with water from tank 33. The shaft 76 then leaves lever 37 and allows the valve 36 to close, during which time the lever 92 of the bucket bail 86 rides under track 91 and opens the bucket closure 85 so as to set the watered plant in the furrow. As the machine continues on, the bucket rises from the set plant and soil falls into the furrow and onto the plant roots from the sides of said furrow. This and additional soil immediately forced into the furrow by the wheels 53 is packed onto the plant roots and around the lower part of the plant by said wheels 53 to retain the plant upright after the bucket completely leaves the plant. The bucket coacts with the top of the plant in leaving the latter to hold the plant upright until the packing of the soil is substantially completed by the wheels 53. The water flows from the bucket to the roots of the plant while soil falls into the furrow onto said roots, thereby aiding packing of the soil and propagation of the plant. As soon as the bucket completely leaves the set plant, the lever 92 rides from beneath the track 91 and allows the closure 85 to gravitate to closed position so that the bucket is readied for reception of another plant.

From the foregoing description, it will be seen that the invention provides a machine which effectively accomplishes the stated objects. Changes in details of construction and modifications may be made without departing from the spirit of the invention as claimed.

What I claim is:

1. In a plant setting machine, a rotary plant setting wheel mounted upon a transverse horizontal axis and including spaced disks and a plurality of spaced open-top bottom-opening plant-receiving dibble-type buckets pivotally mounted between said disks adjacent the periphery thereof, means operatively connected to said buckets to maintain them in an upright position during rotation of the wheel, and means for successively opening said buckets to deposit plants in the ground as each bucket arrives at its lowermost position during rotation of the wheel, each bucket comprising an elongated tube pointed at its lower end and having a bottom opening disposed at an acute angle relative to the longitudinal axis of the tube, a closure for said bottom opening, means mounting said closure for pivotal and vertical swinging movement relative to said tube, said last-named means including a bail embracing said tube and pivoted thereto for vertical swinging movement, said closure being pivoted on said bail, said means for opening said buckets including a crank fixed to said bail and a cam mounted adjacent the lowermost portion of said wheel in the path of said crank to contact and swing the same as each bucket arrives at the aforesaid lowermost position.

2. In a device as described in claim 1, further characterized by a guide rod on said tube, and an eye member carried by said closure and slidable on said guide bar.

CLAUDE L. CARELOCK.

REFERENCES CITED

The following references are of record in the file of this patent:

UNITED STATES PATENTS

| Number | Name | Date |
| --- | --- | --- |
| 269,893 | Tilley | Jan. 2, 1883 |
| 398,754 | Stratton | Feb. 26, 1889 |
| 461,920 | Mole | Oct. 27, 1891 |
| 518,657 | Whitworth | Apr. 24, 1894 |
| 859,536 | Albert | July 9, 1907 |
| 893,886 | Tinsman | July 21, 1908 |
| 1,092,454 | Riemenschneider | Apr. 7, 1914 |
| 1,230,806 | Shaffer | June 19, 1917 |
| 1,753,017 | Oppenheim | Apr. 1, 1930 |
| 1,802,273 | Richards et al. | Apr. 21, 1931 |
| 1,806,622 | Gibbens | May 26, 1931 |
| 2,032,251 | Brooks | Feb. 25, 1936 |
| 2,348,787 | Cordes | May 16, 1944 |
| 2,486,462 | Carelock | Nov. 1, 1949 |

FOREIGN PATENTS

| Number | Country | Date |
| --- | --- | --- |
| 205,825 | Great Britain | Jan. 15, 1925 |
| 422,252 | Germany | Nov. 30, 1925 |
| 658,498 | France | Jan. 26, 1929 |